United States Patent [19]

Rosenblad

[11] 4,216,002
[45] Aug. 5, 1980

[54] SELECTIVE CONDENSATION PROCESS AND CONDENSER APPARATUS

[75] Inventor: Axel E. Rosenblad, Highlands, N.J.

[73] Assignee: Rosenblad Corporation, Princeton, N.J.

[21] Appl. No.: 2,685

[22] Filed: Jan. 11, 1979

Related U.S. Application Data

[63] Continuation of Ser. No. 737,683, Nov. 1, 1976, abandoned.

[51] Int. Cl.² .............................................. B01D 51/00
[52] U.S. Cl. ........................................ 55/267; 203/87; 159/13 B; 159/28 B
[58] Field of Search ................ 159/13 B, 28 R, 28 L, 159/47 WL, 27 R, 13 R; 55/80, 267; 203/87

[56] References Cited

U.S. PATENT DOCUMENTS

| 724,511 | 4/1903 | Schutt | 159/13 B |
|---|---|---|---|
| 2,215,189 | 9/1940 | Peterson | 203/87 |
| 3,195,515 | 7/1965 | Blizard | 55/343 |
| 3,261,392 | 7/1966 | Jacoby | 159/17 R |
| 3,351,119 | 11/1967 | Rosenblad | 202/236 |

*Primary Examiner*—Norman Yudkoff
*Attorney, Agent, or Firm*—Brooks, Haidt, Haffner & Delahunty

[57] ABSTRACT

Contaminant substances having high biochemical oxygen demand, foul odors, etc., are often carried by vapors to be condensed in industrial processes. Certain of these contaminants are more volatile than the primary constituent of the vapor to be condensed. The invention concerns a process and apparatus for separating most of the more volatile contaminants so that separate streams of condensate are produced, one of which is relatively clean while the other stream, though considerably smaller in volume, carries most of the contaminants. A plate type surface condenser having a barrier on the condensing side which prevents the passage of contaminants into a stream of relatively clean condensate is disclosed. In case several different streams of condensate are to be separated, the condenser apparatus has several sections arranged in series.

16 Claims, 7 Drawing Figures

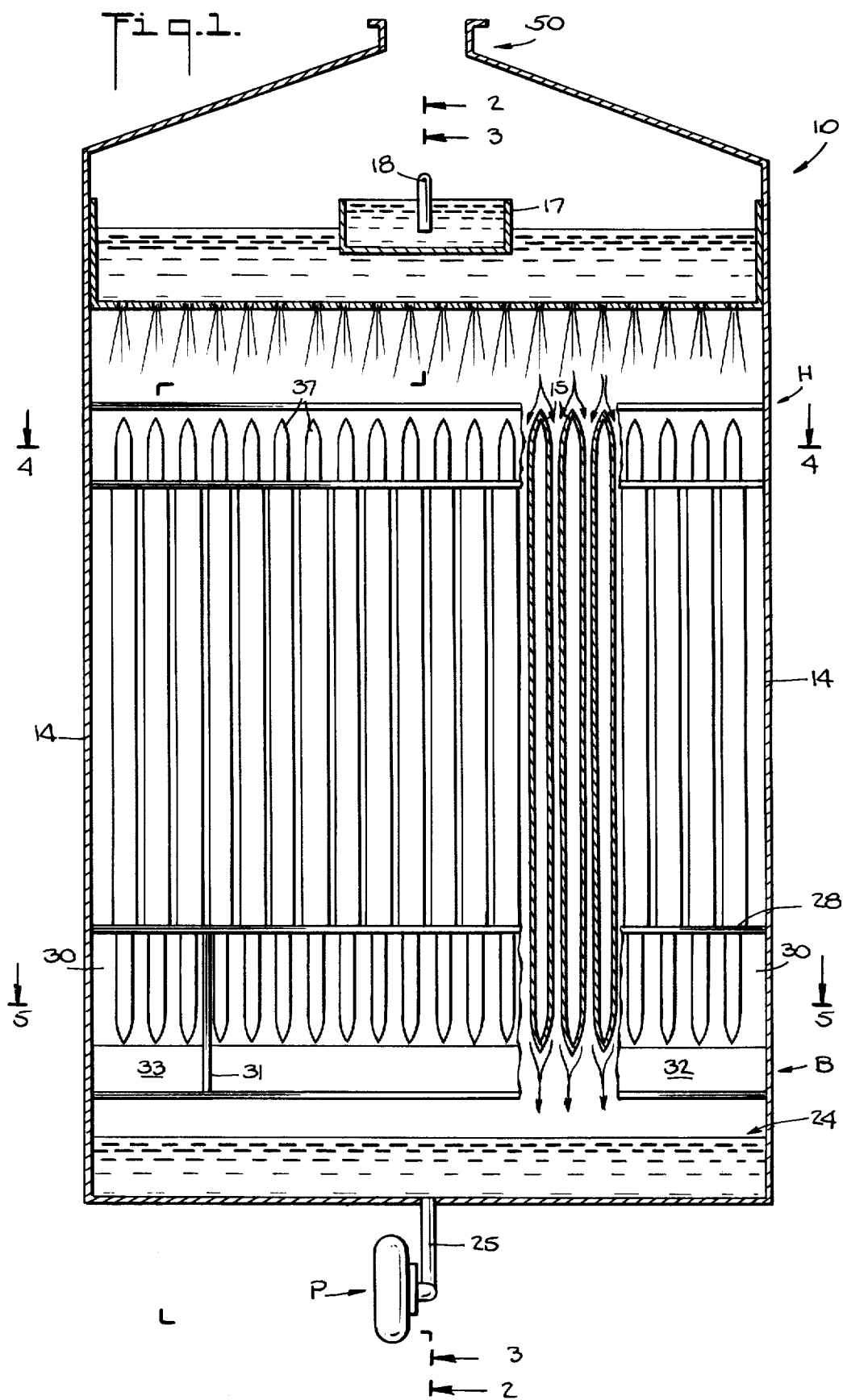

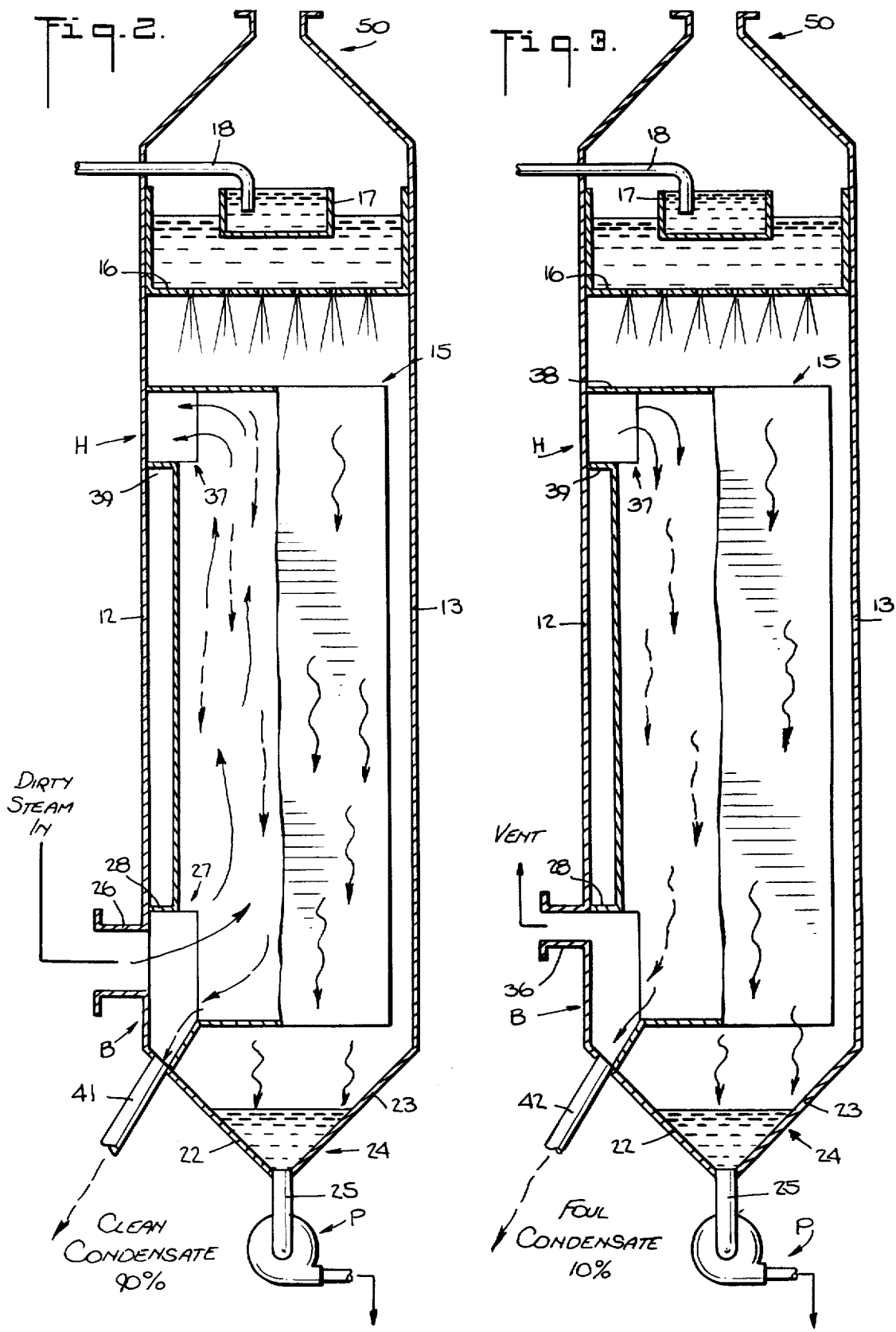

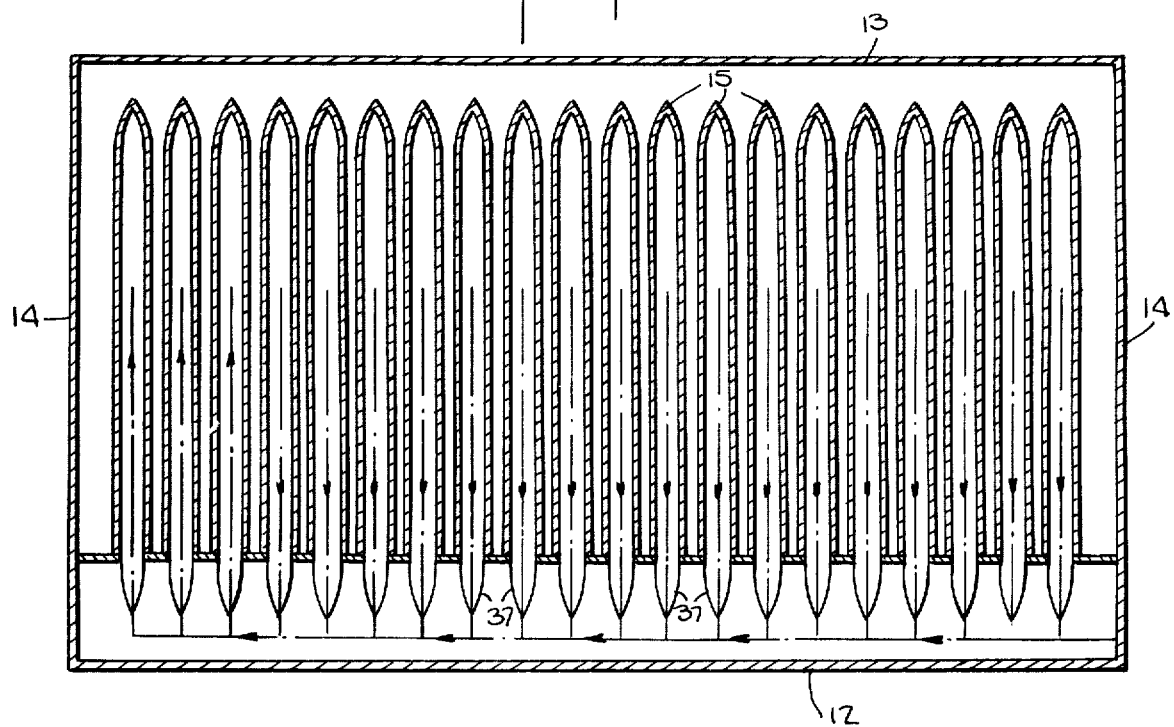
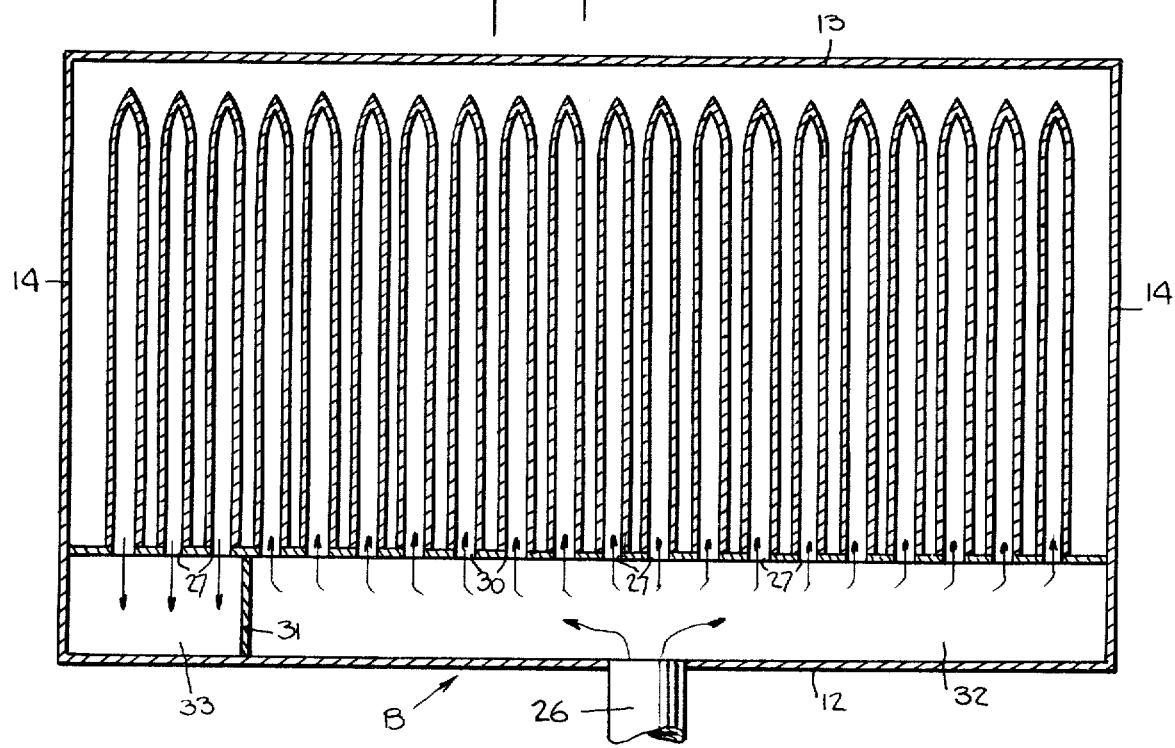

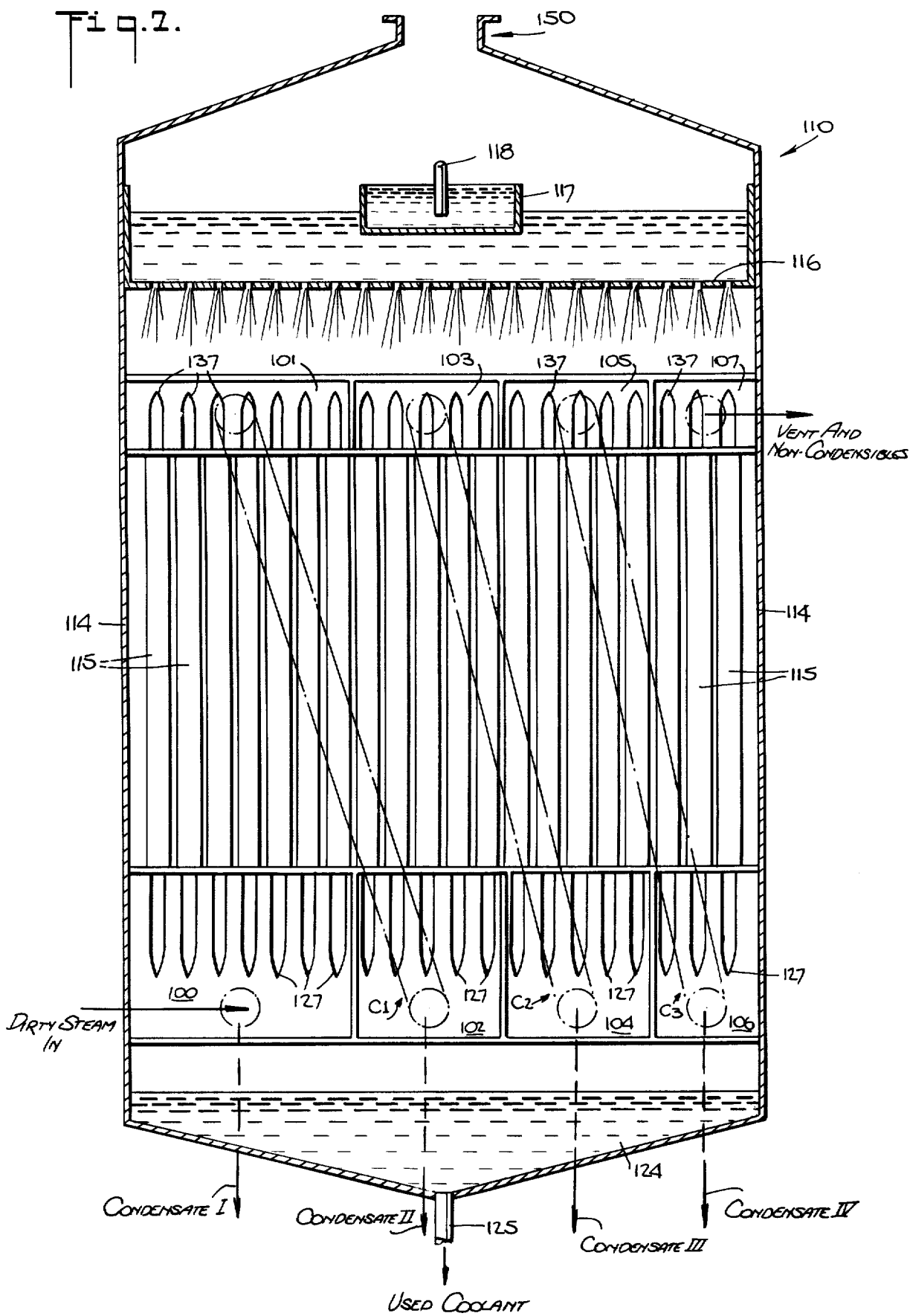

SELECTIVE CONDENSATION PROCESS AND CONDENSER APPARATUS

This is a continuation of application Ser. No. 737,683, filed Nov. 1, 1976 now abandoned.

BACKGROUND OF THE INVENTION

1. Field of the Invention

The invention relates to the condensation of vapor in industrial processes, by means of a plate type condenser.

2. Description of the Prior Art

In many industrial applications, the vapor or steam produced in an evaporator is subsequently condensed for removal from the system, re-use of water or for some other reason. For example, surface condensers used in evaporator systems in the pulp and paper industry allow re-use of warm condenser water recovered from steam.

When steam or other vapor to be condensed carries components in the vapor phase that are more volatile than the water or other substances comprising the principal constituent to be recovered by condensation, one way to treat the vapor is to fully condense everything, including the more highly volatile materials, often, by subcooling to a considerable degree.

Evaporator and condenser systems in several kinds have been illustrated in FIG. 11–17 at page 11-25 of Perry's *Chemical Engineer's Handbook*, Fourth Edition, 1963.

U.S. Pat. No. 3,788,954 to Cantrell relates to a distillation process and shows a condensation section having upper and lower condensation chambers separated by a horizontal wall or baffle intended to separate less volatile from more volatile components of vapor being condensed. U.S. Pat. No. 3,261,392 shows an evaporator having a vertically disposed baffle dividing a heating space; and plate type heat exchangers have been described in C. F. Rosenblad's U.S. Pat. No. 3,332,469.

There is considerable experience and other published information relating to industrial heat exchange technology in general, and more particularly to surface condensers of various kinds. Yet no fully satisfactory system for the effective separation of condensate in a plate type heat exchanger to concentrate the more volatile components of steam or other vapor being condensed from those that are less volatile has achieved wide industrial acceptance. The present invention overcomes difficulties of prior art systems and provides a highly effective method and apparatus for selective condensation.

SUMMARY OF THE INVENTION

The condenser of the invention comprises a housing enclosing a plurality of heat exchange elements outside of which elements a coolant fluid passes to condense vapor within the elements. Preferably the heat exchange elements are formed of pairs of broad plates secured together around their peripheries with an opening to the interior of each element at the top and bottom of each element. A header communicates with all of the elements at their upper ends so that vapor can pass freely from one element to another for condensation within the elements. A bottom header opens on to each element, but there is a barrier closing off one end portion of the bottom header from the other end thereof.

Vapor to be condensed is fed to the interiors of all those heat exchange elements at one side of the header barrier. The vapor rises within those elements and is partially condensed therein. The condensate formed comprises the more easily condensed constituents of the vapor.

The more volatile components of the vapor are not so readily condensed and pass on through the upper header to the heat exchange elements whose bottoms open to the lower header on the other side of the barrier from the vapor entry area. Further cooling condenses the more volatile components and the condensate containing these contaminant substances collects at the bottom of the condenser at the other side of the barrier from the cleaner condensate, and the contaminated condensate is withdrawn as a separate stream from the clean liquid. Noncondensible and vent gases exit from the same side of the barrier as the contaminated condensate.

Most of the heat exchange elements communicate with the vapor entry side of the lower header, and most of the condensate is withdrawn from that side. The vapor passes upwards through this majority of the heat exchange elements.

The smaller number of heat exchange elements wherein the more volatile substances are condensed carry the vapor downward so that vent and noncondensible gases can exit at these elements' lower ends. The vent gases can subsequently be condensed and their heat recovered in subsequent treatment.

The foregoing description has followed the vapor being condensed, but the coolant flow should also be considered. The cooling medium can be a continuous supply of cooling water which is heated while condensing the vapor; or cooling water that is recycled by means of a circulation pump and cooled by means of evaporative cooling outside the system shown before return to the condenser as coolant; or liquid which is to be evaporated. In the latter case, where water or other liquid to be evaporated is employed as the coolant medium for condensing the vapor inside the heat exchange elements, the flow of liquid as a thin film down the outside surfaces of the heat exchange elements results in evaporation of a considerable amount of the coolant liquid. Thus, while the interior spaces within the heat exchange elements are working as a condenser, the exterior space outside the heat exchange elements and within the housing, functions as an evaporator.

Pilot plant trials have been made by condensing steam contaminated by substances that are malodorous and have high biochemical oxygen demand (BOD). About 90% of the condensate is formed during the upward pass of steam through the heat exchange elements on the steam entry side of the barrier, but the condensate produced in this pass and discharged from the bottom header carries less than 20% of the contaminants. The remaining 80% of the contaminant substances go over to the downward flowing stream in the elements whose bottoms communicate with the lower header on the other side of the barrier. The 10% of the total condensate produced and collected on that side of the barrier and the vent gases discharged on the dirty condensate side together carry over 80% of the total contaminants.

The relatively clear condensate stream from the majority of the elements in essentially odor free and can be recycled to the mill or plant without further treatment.

The separated stream of contaminated water can be passed on for further treatment in a stripping column or the like.

These and other objects and advantages of the selective condensation system of the invention will be more fully understood from the following detailed description of the invention, especially when that description is read with reference to the accompanying drawing.

BRIEF DESCRIPTION OF THE DRAWING

In the drawing, in which like reference characters indicate like parts throughout:

FIG. 1 is a sectional view through apparatus according to the invention;

FIG. 2 is a view in section taken perpendicular to that of FIG. 1 along a line vertically bisecting FIG. 1 and looking toward the left of FIG. 1, with parts broken away to show the flow through a heat exchange element on the clean condensate side of the apparatus.

FIG. 3 is a view similar to that of FIG. 2, but showing the foul condensate side of the apparatus;

FIG. 4 is a view in section taken along lines 4—4 of FIG. 1 and looking downward, with the path of flow through the upper part of the apparatus shown;

FIG. 5 is a view in section taken along lines 5—5 of FIG. 1 showing the flow at the lower part of the apparatus;

FIG. 7 is a view in section of apparatus according to the invention for producing several separate condensate streams.

DETAILED DESCRIPTION OF A PREFERRED EMBODIMENT

Figure 6:
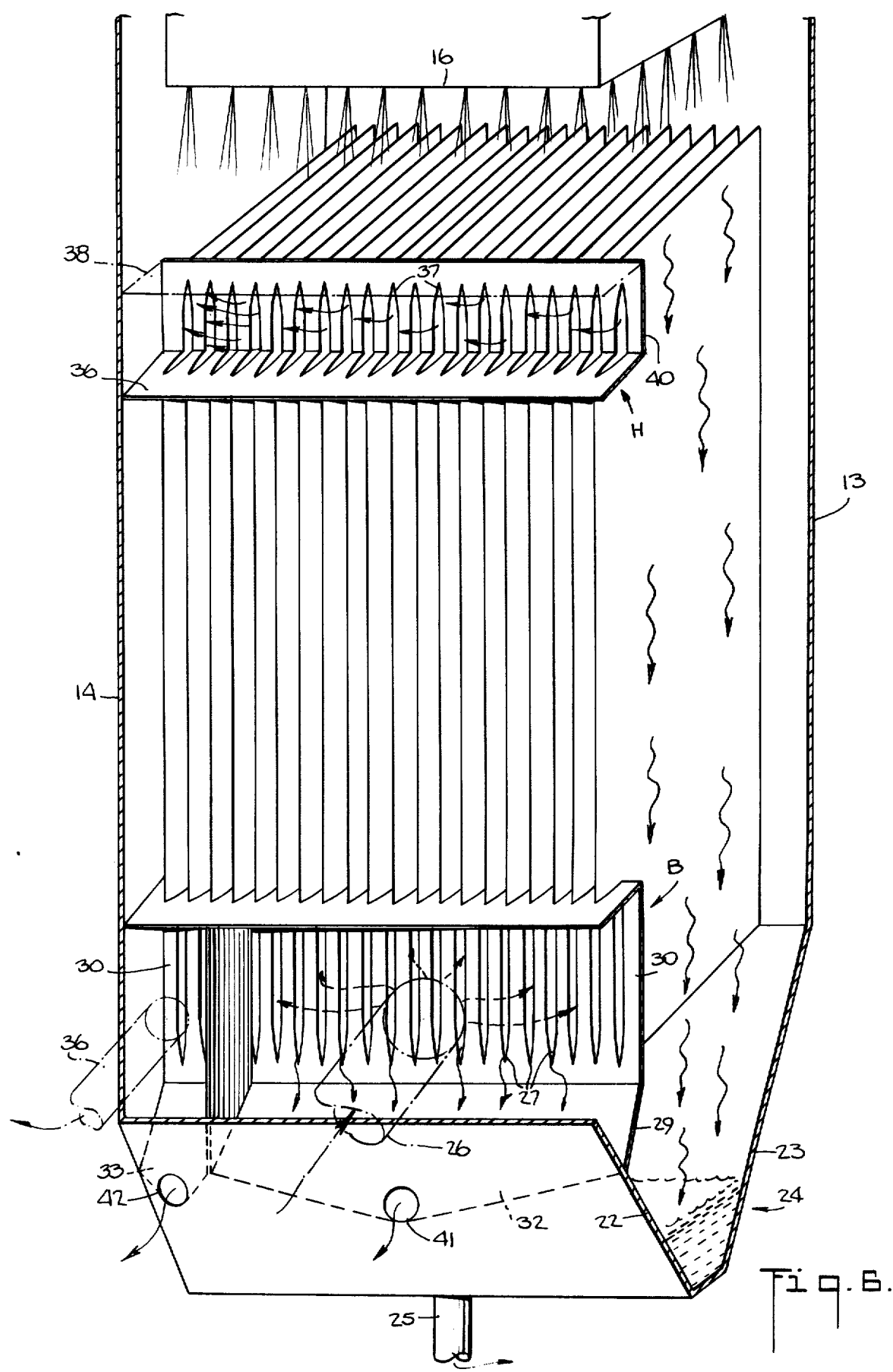
FIG. 6 is a view in perspective of apparatus of FIGS. 1-5 with some parts broken away and some parts illustrated by dashed lines.

In the drawings the condenser of the invention, generally designated 10, has a housing 11 with generally vertically extending front and back walls 12 and 13 respectively and a pair of side walls 14. Within the housing 11 there is an array of spaced, parallel falling film heat exchanger elements 15. The heat exchange elements 15 are of the type formed by pairs of spaced parallel broad flat plates secured together around their peripheries to provide enclosed spaces within the elements 15. A preferred method of manufacturing plate heat exchange elements is disclosed in my prior U.S. Pat. No. 3,512,239 granted May 19, 1970. As those familiar with the art will understand, the elements 15 can be employed to condense steam or other vapors passing within the elements 15 by indirect heat exchange with a coolant medium, such as water flowing as a thin film down the outer surfaces of the elements 15.

Means for introducing coolant liquid into the housing 11 and distributing the liquid evenly over the surfaces of heat exchange elements 11 are shown in FIGS. 1, 2 and 3. A perforated, generally horizontally disposed tray 16 is mounted across the interior of the housing 11, above and spaced from the heat exchange elements 15. Water or other coolant liquid flows through the perforations of the tray 16 to run down the outer surfaces of the heat exchange elements 15 as illustrated in the several drawing figures. Preferably the cooling liquid is not poured directly onto the tray 16, but is fed to an upwardly open box 17 spaced above the tray 16 to overflow the box 17 and thus distribute liquid more evenly. When very large amounts of liquid coolant are used, the box 17 is not needed. Pipe 18 is shown in FIGS. 2 and 3 leading to the box 17 for supplying cooling liquid thereto.

Water or other cooling liquid that has traversed the vertical length of the heat exchange elements 15 is shown in FIGS. 1, 2, 3, and 6 to be collected at the bottom of the housing 11, where inwardly converging bottom portions 22 and 23 of the front and back walls 12 and 13 form a trough 24. Liquid is discharged from the trough 24 through an outlet conduit 25. The inlet pipe 18 can supply additional fresh coolant liquid as needed to the tray 16. If recycling of the coolant liquid is desired, a pump and means for cooling the liquid before recycling can be used.

The preferred structure related to flow of liquid externally of the heat exchange elements has as one result the provision of a uniform and effective flow of coolant along the outer surfaces of the heat exchange elements 15 to condense steam or other vapor within the elements 15.

Steam or other vapor to be condensed enters through the front wall 12 of the housing 11 by way of a conduit 26 as best shown in FIGS. 2, 5 and 6 of the drawing. A baffle (not shown) can be provided to promote better distribution of the vapor. The conduit 26 is located at the lower part of the condenser 10 adjacent the lower ends of the heat exchange elements 15. It will be seen that the lower front corner of each heat exchange element 15 has a cutout area as shown at 27 in FIGS. 2, 5 and 6; that is, the peripheries of the plates forming the plate type heat exchange elements 15 are not sealed together at the elements' lower front corners. Alternately inlet and outlet boxes could be welded on the elements 15, or some other method of fabrication could be employed. The cutouts or openings 27 all communicate with a bottom header B that extends across the front of the housing 11 as shown in FIG. 1. It will be seen that the bottom header B has a top wall 28 and a bottom wall 29, that the front wall 12 of the housing forms a front wall of the header B, and that except for the openings 27 into the interiors of the heat exchange elements 15, the header B is closed at its rear by a back wall 30. Thus, nothing can pass to or from the bottom header B to the space within the housing 11 where cooling liquid circulates, and the header B communicates with the interior spaces of the heat exchange elements 15 through the openings 27.

Steam or other vapor to be condensed enters the bottom header B through the conduit 26 and thence passes to the heat exchange elements 15 via openings 27 to be condensed as it passes upward as shown in FIG. 2.

The header B is not open and continuous along the entire length of the front of the housing 11, but is interrupted by a barrier 31, as shown in FIGS. 1, 5 and 6. Vapor entering the header B through the conduit 26 can only pass directly to some of the heat exchange elements 15, the openings 27 of the other elements 15 being separated from the conduit 26 by the barrier 31.

It has been found that the barrier 31 should preferably be positioned to divide the bottom header B into a relatively longer section 32 and a relatively shorter section 33. This permits direct communication of most of the heat exchange elements 15 with the vapor entering through the conduit 26 by way of the longer header section 32 as seen in FIGS. 5 and 6.

Attention is now directed to the upper front area of the heat exchange elements where an upper header H is shown to extend within the housing 11 to interconnect the upper front ends of all of the heat exchange elements 15. The upper header H extends unobstructed across the entire array of heat exchange elements 15, which elements 15 all have cutout or unjoined areas at 37 opening on to the upper header H. Except for the openings 37 communicating with the interiors of all of the heat exchange elements 15, the upper header is enclosed by a top wall 38, bottom wall 39, rear wall 40 and by the housing front wall 12.

The structure of the headers B and H, and the arrangement of heat exchange elements 15 which have openings only at 27 and 37, thus constrains vapor to flow upward through those elements 15 which communicate with the header B at the portion 32 and to flow downward through those elements 15 which communicate with the area 33 of the bottom header B on the other side of the barrier 31. These flow paths will be more fully apparent from FIGS. 4, 5, and 6.

Condensate formed within the heat exchange elements 15 is discharged by way of two condensate outlets 41 and 42, shown in FIGS. 2, 3 and 6. The condensate outlet 41 drains the portion 32 of the bottom header B and the condensate outlet 42 serves to drain the shorter portion 33 of the bottom header B. Thus the outlet 41 is located below the vapor inlet conduit 26 and the outlet 42 is located below the vent and noncondensible outlet conduit 36. As shown in FIG. 6, the lower wall of the bottom header B can be formed to facilitate condensate discharge.

The barrier 31 splits the bottom header B into two unequal sections 32 and 33 as already indicated. Thus vapor such as steam to be condensed is passing upward through most of the heat exchange elements 15. The relationship between the amounts of heating surface provided by the sections 32 and 33 depends upon the fluid to be condensed. As an example, for a pre-evaporator for spent liquor from the kraft pulping process, it is presently preferred that about 90% of the heat exchange elements 15 be in communication with the steam entry portion 32 of the bottom header B, the remaining elements 15 communicating with the vent outlet area 33 of the header B. For other services, a ratio other than 9 to 1 can be effectively employed.

In the typical case, of the pre-evaporator for spent kraft pulping liquor where steam is to be condensed, about 90% of the steam is condensed during the upward pass through the majority of the heat exchange elements 15, leaving only about 10% of the steam to travel along the upper header H for the downward passage through heat exchange elements 15 that communicate with the outlet 36. However this 10% of the steam is very rich in the lower boiling point or volatile contaminant substances. The condensate formed during the downward pass and discharged through the outlet 42 is much richer in malodorous compounds and BOD-producing components than the condensate discharged on the steam entry side through the outlet pipe 41. Pilot plant trials have produced a yield of less than 20% of the BOD and malodorous condensate in the 90% of the condensate formed during the upward pass of the steam, and over 80% of the BOD and foul-smelling components have appeared in the condensate and vent gases exiting at the vent 36 and condensate outlet 42.

The foregoing discussion has treated the flow of vapor through the interiors of the heat exchange elements 15 and has treated the liquid coolant flowing down the exterior surface of the heat exchange elements only as a coolant for the vapor to be condensed. However, it is also important to consider evaporation of this coolant liquid by heat transfer from the condensing vapor. As the water or other coolant liquid flows down the heat exchange elements 15 as a film, a considerable amount of the liquid will evaporate. This result can be advantageously used by employing as the coolant a liquid which is to be evaporated. Thus, while the interior spaces of the heat exchange elements 15 are working as a condenser, the exterior space outside the elements 15 and within the housing 11 works as an evaporator.

For example, liquor re-circulated to the tray 16 by the pump P is mixed with liquor to be evaporated which is introduced through the pipe 18 and boiled off vapors pass outward from among the heat exchange elements 15 as the liquor is heated by the hot vapor within the elements 15. The vapor boiled off rises to the upper part of the apparatus, above the tray 16. FIG. 6 of the drawing illustrates how the housing wall 13 can be spaced from the nearest heat exchange element 15 to permit outward and upward flow of boiled-off vapor within the housing 11. This vapor can then be allowed to pass upward either through space provided alongside the tray 16 or through a conduit to the top of the housing 11, where an entrainment separator or the like (not shown in the drawing) can be provided for treatment of the vapor generated by evaporation of the liquid coolant. FIGS. 1-3 show the housing 11 as vented centrally at is top at 50, but it will be understood by those familiar with the art that an entrainment separator can be provided at the location shown by the reference numeral 50 to capture droplets of liquid carried by the flow of vapor.

The system for selective condensate separation according to the invention is not limited to the separation of two condensate streams, but can be extended to the separation of three or more streams of condensate with different degrees of purity. FIG. 7 shows an arrangement for selective condensation of four condensate streams, indicated as condensates I through IV, of which condensate stream I is made up of the most readily condensed portion of the feed and condensate stream IV contains the most difficult to condense of the substances that are condensed within the apparatus.

It will be seen that the apparatus of FIG. 7 has a housing like that of the previously discussed embodiment, with side walls 114 corresponding generally to the walls 14 in FIG. 1, a liquid distribution tray 116 similar to the tray 16, heat exchange elements 115 like the elements 15, and so on. The apparatus of FIG. 7 differs from the embodiment shown in the other drawing features in that it is sectionalized to separate the several condensates. The spaced parallel heat exchange elements 115 have their lower openings 127 and upper openings 137 arranged in four groups. Vapor to be condensed is fed to a chamber or compartment 100 communicating with a number (7 shown) of the heat exchange elements 115 at their lower openings 127 for the condensation of some of the vapor within those elements 115 as the vapor rises upwardly within the interior spaces of the elements. Vapor not condensed in passage upward through the elements 115 of this first group emerges into a chamber 101 at the upper end of the elements 115 of the first group. Condensate formed in the elements of the first group is relatively free of hard-to-condense substances, and is drawn off from the bottoms of the elements 115 as condensate I.

The chamber 101 is closed except for the openings 137 of the first group of heat exchange elements and a conduit C 1 shown in dashed lines as C 1 which leads uncondensed vapor from the chamber 101 to a chamber 102 that opens on to a second group of elements 115 at the lower openings 127. The vapor passes upwards through the interior spaces of this second group or elements 115 wherein some is condensed to be drawn off as condensate II while the uncondensed remainder emerges into a chamber 103 at the upper ends of the elements. The process is repeated as vapor is passed downward through conduit C 2 to a chamber 102 and thence upwards through the interior spaces of a third group of heat exchange elements 115 wherein further condensation occurs. Vapor emerging into the upper chamber 105 is passed down to the final lower chamber 106 by way of conduit C 3 and the final upward passage through several heat exchange elements 115 (three shown) condenses volatile components to produce condensate stream IV which contains the most difficult to condense of the vapors that are condensed in the system. Vent gas and remaining uncondensed vapors exit from chamber 107 at the top of the last group of heat exchange elements 115 as shown at the upper right in FIG. 7.

Embodiments separating two and four different condensates have been illustrated, but it will be clear that three condensates, or more than four could also be differentiated in apparatus according to the invention.

Various modifications, applications, substitutions of parts and structural variations of the method and apparatus described in terms of a presently preferred embodiment will suggest themselves to those familiar with heat exchange techniques and are considered to be within the spirit and scope of the invention.

What is claimed is:

1. Apparatus for selective condensation of vapors contaminated by volatile substances to produce a first, relatively clean stream of condensate and a second condensate stream carrying more of contaminants than said first stream, comprising a falling film heat exchanger having a plurality of plate heat exchange elements wherein vapor is condensed by the flow of liquid down surfaces of the heat exchange elements, each of said heat exchange elements comprising a pair of spaced generally parallel plates sealed together around substantially their entire peripheries, upper header means communicating with all of said heat exchange elements near an upper end of each such heat exchange element for the free passage of vapor among the upper portions of the heat exchange elements, a lower header enclosing all of said heat exchange elements, said lower header having a top wall, a bottom wall, a front wall and a back wall, an inlet and outlets connected to said lower header, and a barrier extending from said top wall to said bottom wall and from said front wall to said back wall of said lower header to separate said lower header into non-communicating compartments, said inlet constituting means for introducing vapor to be condensed into lower portions of one group of said heat exchange elements via an opening through said lower header back wall into the interior of each element of said one group for upward passage of vapor within said one group of heat exchange elements, one outlet connected to said lower header constituting a first condensate outlet for discharging said first condensate stream from the elements of said first group, a second group of heat exchange elements wherein vapor to be condensed passes downward after said upward passage, each element of said second group opening on to said lower header through said lower header back wall on the opposite side of said barrier from the elements of said first group, vent gas outlet means and second condensate outlet means connected to said lower header and spaced away from said first condensate outlet for discharging said second condensate stream and vent gases from the heat exchange elements of said second group, said barrier preventing contact between said first and second condensate stream said first and second condensate outlets being non-communicating.

2. The apparatus of claim 1 wherein said second condensate stream is of lesser volume than the first stream of condensate.

3. The apparatus of claim 1 wherein liquid coolant is distributed to said element surfaces by means above said heat exchange elements, and including means for collecting liquid after flow over said elements and means for discharging vapor evaporated from said liquid.

4. The apparatus of claim 3 and including means for recirculating liquid collected to the liquid distributing means above said heat exchange elements.

5. A method for selective condensation of vapor contaminated by volatile substances in a falling film heat exchanger having a plurality of heat exchange elements comprising introducing vapor to be condensed into a lower header enclosing all of said heat exchange elements through an inlet thereto, said lower header having a top wall, a bottom wall, a front wall and a back wall, and outlets connected to said lower header, and a barrier extending from said top wall to said bottom wall and from said front wall to said back wall of said lower header to separate said lower header into non-communicating compartments, and passing said vapor from said lower header into lower portions of an interior space of each of a first group of heat exchange elements of the heat exchanger for upward passage of the vapor through the heat exchange elements of said first group while less volatile constituents of said vapor are substantially condensed during said upward passage, and discharging condensate produced during said upward passage as a first condensate stream through a first condensate outlet connected to said lower header; leading uncondensed vapor by way of an upper header communicating with all of said heat exchange elements from upper portions of the interior spaces of the heat exchange elements of said first group to the interior spaces of upper portions of heat exchange elements of a second group for downward passage through the heat exchange elements of said second group, and thence into said lower header on the opposite side of said barrier said first group of heat exchange elements, and withdrawing condensate produced during said downward passage by way of a second condensate outlet connected to said lower header as a second condensate stream which is more highly contaminated by said volatile constituents than said first condensate streams separate, said first and second condensate outlets being non-communicating and removing uncondensed vapors from the elements of said second group.

6. The method of claim 5 wherein most of the vapor is condensed during said upward passage so that said first condensate stream is considerably greater in volume than said second condensate stream.

7. The method of claim 5 wherein coolant liquid is distributed to all of said heat exchange elements from above said elements to flow downward over outer surfaces of said heat exchange elements, and including collecting coolant liquid which has passed over the heat exchange elements and recirculating collected coolant liquid.

8. The method of claim 5 wherein the vapor to be condensed is primarily steam from an industrial process.

9. The method of claim 5 wherein said uncondensed vapor is removed from the elements of said second group near lower ends of said elements.

10. A falling film heat exchanger comprising: a housing, a plurality of plate-type heat exchange elements within said housing, means for distributing coolant liquid to outer surfaces of said heat exchange elements, an upper transverse header communicating with upper ends of all of said heat exchange elements, a lower transverse header enclosing all of said heat exchange elements and communicating with lower ends of all of said heat exchange elements, said lower header having a top wall, a bottom wall, a front wall and a back wall, an inlet and outlets connected to said lower header and a barrier extending completely across said lower header from said top wall to said bottom wall and from said front wall to said back wall thereof for separating said lower header into non-communicating compartments and prohibiting passage of vapor and liquid between a vapor entry compartment of said lower header and a vent discharge compartment of said lower header, said inlet constituting means for introducing vapor to be condensed into said vapor entry compartment of said lower header, and one said outlet constituting means for discharging uncondensed substances from the vent discharge compartment of said lower header, said vapor entry compartment of said lower header communicating directly only with a first group of said heat exchange elements and said vent discharge compartment of said lower header communicating directly only with a second group of said heat exchange elements, one said outlet being a first condensate outlet for discharging condensate from said first group of heat exchange elements via said vapor entry compartment of the lower header, and another said outlet constituting a second condensate outlet for discharging condensate from said second group of heat exchange elements via said vent discharge compartment of the lower header, said first and second condensate outlets being non-communicating.

11. The apparatus of claim 10 and including means for collecting coolant liquid below said heat exchange elements, means for recirculating said coolant liquid, and means for discharging vapor evaporated from said coolant liquid by heat exchange with said vapor to be condensed.

12. Apparatus for condensation of vapors containing volatile contaminant substances to produce at least two streams of condensate differing in their respective content of such contaminant substances, comprising a falling film heat exchanger having a plurality of plate heat exchange elements within which elements vapor is condensed by a flow of liquid down outer element surfaces, each of said heat exchange elements comprising a pair of spaced generally parallel plates sealed together substantially around their entire peripheries, said heat exchange elements being arranged in groups, each of said groups of heat exchange elements producing a separate and different stream of condensate, upper header means communicating with all of said heat exchange elements near an upper end of each such heat exchange element for the free passage of vapor from the elements of each group to the elements of a next group and a lower header enclosing all of said heat exchange elements, said lower header having a top wall, a bottom wall, a front wall and a back wall, a plurality of barriers extending from said top wall to said bottom wall and from said front wall to said back wall of said lower header to separate said lower header into non-communicating compartments, an inlet connected to said lower header for introducing vapor to be condensed into a first one of said compartments, and a plurality of outlets connected to said lower header, one such outlet being connected to each of said compartments for discharging a stream of condensate from each said compartment, all of said outlets being non-communicating means for discharging uncondensed substances from the last heat exchange element group by way of a compartment of said lower header opening on to said last heat exchange element group.

13. An apparatus for the recovery of heat and easily evaporable components from a first stream of hot gases, which comprises an evaporation unit, means for feeding the liquid to be evaporated into the evaporation unit, means for removing the concentrated liquid from it, and for recycling part of the liquid which is at the bottom of the evaporation unit into its upper section onto a substantially vertical heat exchanger in the upper section, the lower section of the heat exchanger having an inlet for feeding the first stream of hot gases into the heat exchanger, said inlet being connected to a lower header enclosing all of a plurality of heat exchange elements; said lower header having a top wall, a bottom wall, a front wall and a back wall, and outlets connected to said lower header, and a barrier extending from said top wall to said bottom wall and from said front wall to said back wall of said lower header to separate said lower header into non-communicating compartments opening on to said heat exchange elements so that hot gases flow upwards and countercurrently to the liquid flowing along the outer surfaces of the heat exchanger, an upper header communicating with all of said heat exchange elements for comingling of hot gases therein said lower header outlets connected to said lower header on opposite sides of said barrier for separate discharge of condensate formed in each said compartment, said outlets being non-communicating, the upper section of the heat exchanger being connected to one or more successive substantially vertical additional heat exchangers operating by indirect heat exchange, at least one of the additional heat exchangers having at its bottom an outlet pipe for the removal of the produced condensate and the last additional heat exchanger having, at the end opposite to its gas inlet, an outlet for the gases.

14. An apparatus according to claim 13, in which the upper section of the heat exchanger has been connected to the upper section of the first additional heat exchanger in order to cause the gases to flow downwards co-currently in relation to the liquid flowing along the outer surfaces of the first additional heat exchanger, which has as its bottom an outlet pipe for the condensates and the gases.

15. An apparatus according to claim 13, comprising two successive countercurrent heat exchangers which have been connected by means of a gas pipe leading from the upper section of the heat exchanger to the lower section of the first additional heat exchanger.

16. An apparatus according to claim 13, in which the heat exchangers are lamina heat exchangers.

* * * * *